United States Patent [19]

Andreen

[11] 4,121,480

[45] Oct. 24, 1978

[54] INTERNAL COMBUSTION ENGINE AND TRANSMISSION COUPLING

[76] Inventor: John F. Andreen, R.R. #3, Cadillac, Mich. 49601

[21] Appl. No.: 741,936

[22] Filed: Nov. 15, 1976

Related U.S. Application Data

[62] Division of Ser. No. 582,242, May 30, 1975, Pat. No. 3,999,523.

[51] Int. Cl.[2] ........................ F16H 37/08; F02B 75/32

[52] U.S. Cl. ........................................ 74/700; 74/701; 123/197 C

[58] Field of Search ............. 74/700, 701; 123/197 R, 123/197 AC, 197 C

[56] References Cited

U.S. PATENT DOCUMENTS

| | | | |
|---|---|---|---|
| 2,169,120 | 8/1939 | Buzby | 123/197 R |
| 2,444,103 | 6/1948 | Kuhn | 123/197 R X |
| 2,477,376 | 7/1949 | Jacobsen | 123/197 AC |
| 2,606,541 | 8/1952 | Lutz | 123/197 R X |
| 3,150,543 | 9/1964 | Dangauthier | 74/700 |
| 3,324,743 | 6/1967 | De Castelet | 74/700 |
| 3,473,413 | 10/1969 | Stockton | 74/700 X |

*Primary Examiner*—Samuel Scott
*Assistant Examiner*—Lance W. Chandler
*Attorney, Agent, or Firm*—Price, Heneveld, Huizenga & Cooper

[57] ABSTRACT

An opposed piston engine includes pistons mounted at opposite ends of a piston rod which is pivotally coupled to one end of a rocker arm coupling the piston rod to a connecting rod in turn coupled to an eccentric drive mechanism. The rocker arm is pivotally coupled to the engine block by pivot means permitting necessary lineal movement of the rocker arm during operation. Counterbalance arms are pivotally coupled to the engine block at one end and include weighted portions positioned to provide counterbalancing for the opposed pistons. Pivot means couple the rocker arm and the counterbalance arms for providing the desired relative motion between these elements. A hollow drive shaft is coupled to the eccentric drive mechanism and a transmission shaft extends through the drive shaft to permit positioning of a clutch at one end of the engine and the transmission at the other. The engine includes a circumferential oiling recess in each of the cylinder walls and means for controllably applying oil therefrom to the pistons for direct lubrication.

5 Claims, 15 Drawing Figures

INTERNAL COMBUSTION ENGINE AND TRANSMISSION COUPLING

CROSS REFERENCE TO RELATED APPLICATION:

This is a division of application Ser. No. 582,242, filed May 30, 1975, now U.S. Pat. No. 3,999,523.

BACKGROUND OF THE INVENTION

The present invention relates to an internal combustion engine and particularly, to an opposed piston engine with unique drive means for coupling the pistons to a power utilization device.

With the current interest in energy savings through increased fuel economy and reducing air pollution largely caused by exhaust gases from internal combustion engines employed in motor vehicles, several attempts are being made to increase the efficiency of the standard internal combustion engine as well as reduce its pollution. Such attempts include, for example, the addition of pollution control equipment to the engine, the control of fuel to the engine, or the addition of additives to increase mileage. Such added equipment in some cases reduces gas mileage in order to reduce pollution or increases fuel economy at the expense of increasing pollution. With the exception of the Wankel engine, there are no known recent efforts to redesign the basic structure of an internal combustion engine to achieve the goals of lower air pollution and increased fuel efficiency.

The prior art includes a variety of engine designs including opposed piston engines such as represented by U.S. Pat. Nos. 1,719,537 issued to C. Dulche on July 2, 1929; 2,383,648 issued to F. C. Hawkins on Aug. 28, 1945; and more recently, U.S. Pat. No. 3,258,992 issued to J. L. Hittell on July 5, 1966. The prior art structure, however, does not suggest construction capable of relatively high power output and high speed operation required of today's motor vehicle engines nor efficient engines capable of good fuel economy and low pollution. Nor do such engines suggest the unique construction utilized by the engine of the present invention.

SUMMARY OF THE INVENTION

Engines embodying the present invention include piston means pivotally coupled to one end of a rocker arm having its opposite end coupled to a connecting rod. The rocker arm is pivotally coupled to the engine block by pivot means permitting necessary lineal movement of the rocker arm during operation. The connecting rod in turn is coupled to an eccentric drive mechanism for rotating a drive shaft. Counterbalance means coupled to the rocker arm for movement in a direction opposite the piston movement provides counterbalancing during operation.

According to one aspect of the present invention, the drive shaft is hollow permitting the mounting of clutch means at one end of the drive shaft and the extension of the transmission shaft through the drive shaft for coupling to the clutch means at one end of the engine and to a transmission mounted at the opposite end of the engine. Such an arrangement provides easy access to the clutch for repair without requiring removal or "dropping" of the transmission. Also, such an arrangement eliminates the bell housing usually between the engine and transmission and thus, saves space in the passenger compartment.

According to a further aspect of the present invention, direct lubrication means in the form of an oiling recess in the cylinder wall and means for controllably distributing oil therefrom to the pistons is provided for direct and controlled lubrication of the pistons and rings during operation.

The engine of the preferred embodiment of the present invention is a two cycle air cooled engine incorporating an additional pair of opposed pistons coupled to a common piston rod, in turn coupled to the counterbalancing means and pivotally coupled to the engine block for synchronous motion with the first set of opposed pistons. In such an arrangement, the latter pair of pistons can be relatively small and provide, with separate carburetion and manifolding, an engine which can be independently operated for low fuel consumption under low power requirements. In such engine, the combustion chambers associated with the large and small pistons are in continuous direct communication such that a relatively low volume rich fuel/air mixture of the smaller cylinders can be utilized for flame ignition of a lean fuel/air mixture for use in the larger cylinders. This provides significantly reduced exhaust pollutants when all cylinders are in operation for full power.

These and other novel aspects, advantages and objects of the present invention will become apparent upon reading the following description thereof together with the accompanying drawings in which:

DETAILED DESCRIPTION OF THE PREFERRED EMBODIMENT

Before discussing in detail the mechanical details of the various elements of the engine, a brief description of the overall engine concept is noted. Basically, the engine comprises two engines within an engine, the first comprising an igniter engine consisting of a relatively small upper pair of opposed pistons and a main engine including the larger lower pair of opposed pistons, both engines being commonly coupled to a drive shaft. The igniter engine portion of the integral engine of the preferred embodiment utilizes conventional spark ignition of a relatively rich fuel/air mixture supplied by its own carburetor and flame ignites a relatively lean fuel/air mixture fed to the cylinders of the larger main engine by a second carburetor. By so designing the engine, the igniter engine can be run independently for lower power applications or fuel can be supplied to both the igniter and main engine sections for higher power applications. Such design, when used for high power applications, greatly reduces pollutants inasmuch as a relatively low fuel-to-air mixture can be employed and efficiently ignited by the flame ignition from the igniter engine. This, as is well recognized, reduces the nitrous oxides, hydrocarbons and carbon monoxides generally present in the exhaust of an engine employing richer mixtures. Also, such an arrangement permits the use of a fuel such as diesel fuel for the igniter engine, thereby reducing the cost of operation of the main engine as well as further reducing harmful pollutants. Once the engine has been preheated, the gasoline mixture for the igniter engine can be replaced with a diesel fuel supply if desired.

Figure 2:
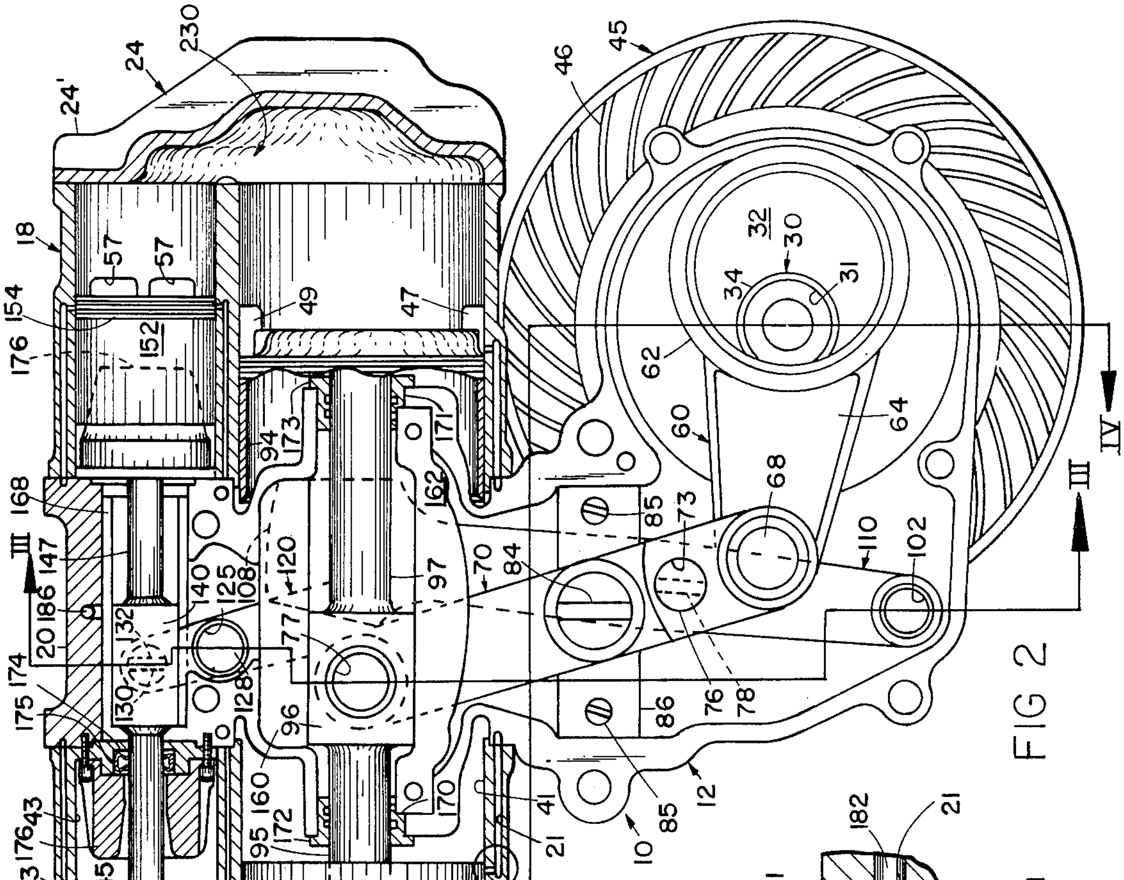
FIG. 2 is a cross-sectional view of an engine embodying the present invention shown partly broken away.
Figure 3:
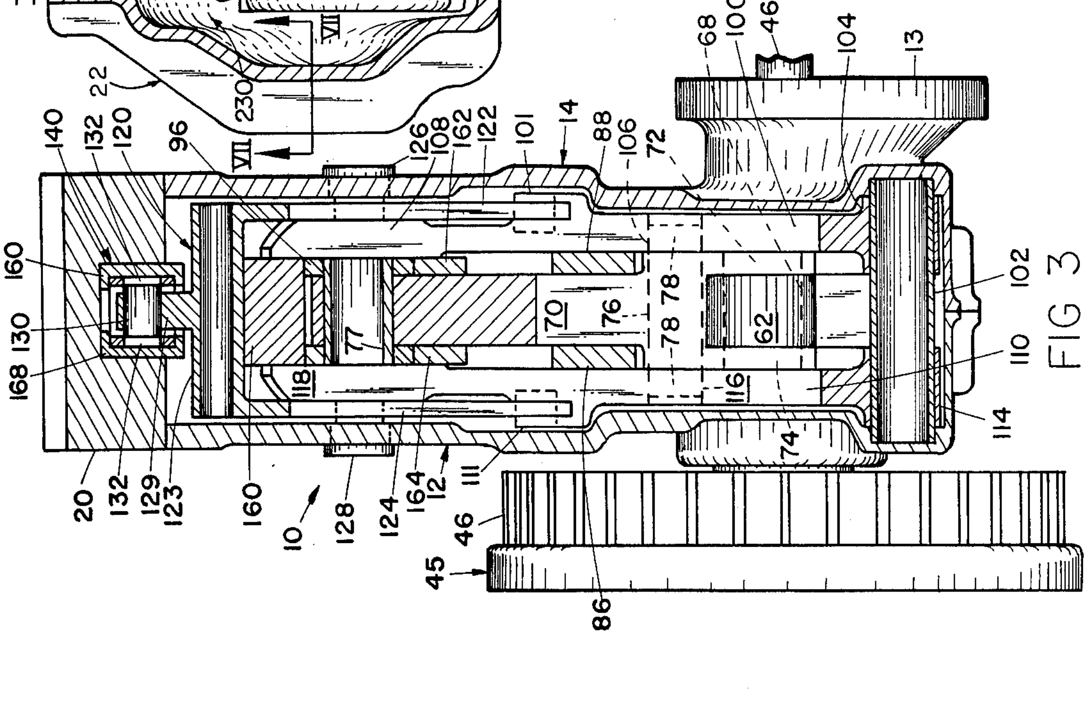
FIG. 3 is a cross section of the engine shown in FIG. 2 taken along section line III—III of FIG. 2.
Figure 4:
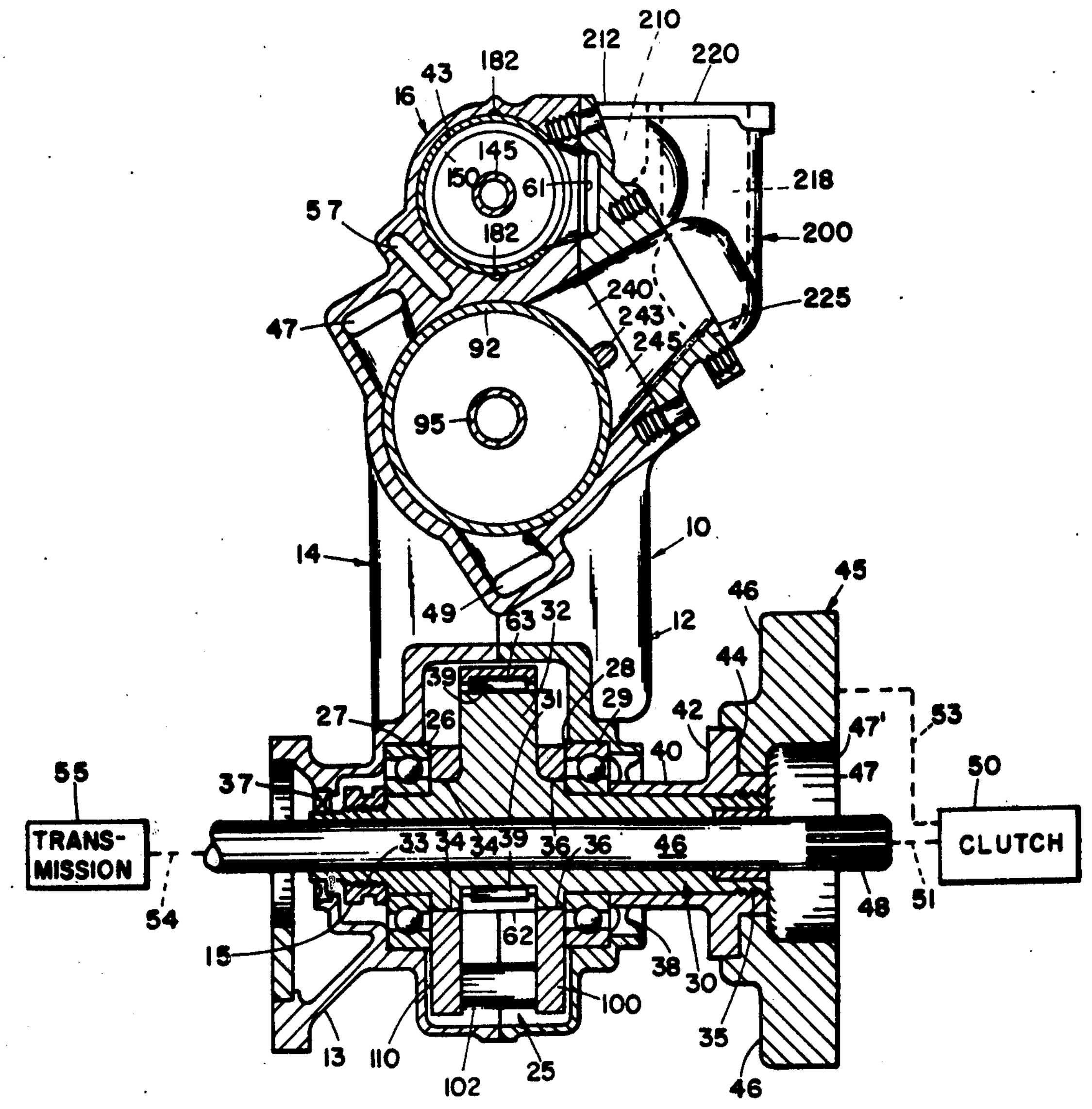
FIG. 4 is a cross-sectional view of one of the cylinders and the drive shaft portion of the engine of FIGS. 1-3 taken along section line IV—IV of FIG. 2 showing the clutch and transmission in schematic form.

Referring initially to FIGS. 2–4, the air cooled two cycle engine 10 includes a left housing 12 and a right housing 14 conventionally secured to one another by bolts to form the lower portion of the engine for housing the lower moving parts typically referred to as the block. Attached to the joined left and right housings are a first cylinder housing 16 and a second cylinder housing 18 which are secured to the joined housings 12 and 14 also by conventional means including gaskets for sealing the housing sections. Access through the top of the stationary housing structure is provided by means of a removable housing cap 20 bolted to the left and right housings 12 and 14 respectively. The exterior enclosing portions of the engine are completed by first and second cylinder heads 22 and 24 respectively. Each of the housing members and heads is integrally cast of a suitable material, preferably aluminum or an alloy thereof.

As best seen in FIG. 4, the lower portions of left and right housings 12 and 14, respectively, define a crankcase 25 which houses the engine drive shaft 30. Drive shaft 30 comprises a hollow elongated shaft supported at opposite ends in the housings by means of a pair of main bearings 26 and 28 seated in recesses 27 and 29 of the housing halves 14 and 12 respectively. The engine design permits the use of relatively simple main bearings as opposed to split bearings frequently required. Shaft 30 includes an aperture 31 extending centrally therethrough. Integrally formed on the drive shaft 30 is an eccentric cam 32 spanned on opposite sides by shoulders 34 and 36 which extend between bearings 26 and 28. Shoulders 34 and 36 are generally annular members surrounding the main body of the drive shaft which terminates at its left end, as seen in FIG. 4, with an externally threaded segment 33 for receiving thereon a threaded spiral drive gear 15 used for auxiliary drive of the distributor rotor and the oil pump. The drive shaft terminates at the right end in a threaded end 35 to which there is threadably secured thereto a flywheel mounting flange 40. A left end seal 37 engages the outer cylindrical surface of drive shaft 30 to seal the shaft where it extends through the left housing 14. Similarly, a right end seal 38 seals the junction of housing section 12 and the external cylindrical surface of flywheel mounting flange 40.

Flange 40 includes a flange portion 42 which fits within an annular recess 44 of the engine's flywheel 45. Flywheel 45 includes a plurality of arcuate segmented fan blades 46, as best seen in FIGS. 2 and 3, which serve to circulate air and can be used in conjunction with suitable shrouds for forcing sufficient air over the engine for cooling. Flywheel 45 is bolted to flange 42 around the periphery thereof by suitable bolts (not shown). A solid transmission shaft 46 extends in spaced relationship through aperture 31 of the drive shaft and has a splined end 48 for coupling to the clutch disc of a conventional throw-out clutch 50 which is further coupled to the flywheel 45 by conventional means. The engine includes a pilot bearing 47 which fits within recess 47′ of flywheel 45 for supporting the right end of the transmission shaft as seen in FIG. 4. The mechanical interconnection of the clutch to the shaft 46 and flywheel 45 is represented by the dotted lines 51 and 53 respectively.

The opposite end of transmission shaft 46 extends outwardly through a transmission mounting housing 13 which forms an integral portion of right housing 14. Housing 13 is shaped and includes drilled and threaded apertures for directly receiving and coupling a conventional transmission 55 to engine 10 with the forward bearing of the transmission serving to support the end of the transmission shaft 46 in spaced aligned relationship within drive shaft 30. A relatively lightweight sheet metal protective shield can be employed to surround the flywheel and clutch which extend from the engine at the opposite end of the transmission shaft. Thus, the engine with its unique drive shaft provides a compact mounting arrangement for the engine in an automobile. For this purpose, each of the housings 12 and 14 includes suitable and conventional motor mounting structure. The coupling of transmission 55 to the transmission shaft 46 is represented by the dashed line 54. Having thus far described in detail the lower portion of the engine housings together with the drive shaft, the primary internal moving parts of the engine are now described in detail followed by a description of the upper cylinder construction. The structure utilized to achieve the flame ignition is described in detail below. The unique mechanical interconnection of the igniter and main engines to the drive shaft utilizing but a single connecting rod can best be understood by reference to FIG. 1 in conjunction with FIGS. 2 and 3.

The single connecting rod 60 includes a first end 62 surrounding the eccentric cam 32 of drive shaft 30. A roller bearing 63 is interposed between the outer surface 39 of the eccentric cam 32 and the circular bearing race in end 62 of rod 60 as best seen in FIG. 4. The body portion 64 of rod 62 tapers to a second end 66 which is pivotally coupled to a rocker arm 70 by means of a connecting rod pin 68 (FIGS. 2 and 3). The rocker arm 70 includes a pair of spaced downwardly depending legs 72 and 74 which span end 66 of the connecting rod and include apertures through which the connecting rod pin 68 extends. The body of rocker arm 70 includes an aperture 73 extending through the rocker arm slightly above the apertures through legs 72 and 74 for pivotally receiving a counterbalance driving pin 76. Pin 76 has tongues 78 extending vertically on opposite ends thereof for engaging counterbalance arms as described below.

The rocker arm is pivotally coupled to the engine housing by means of a rocker arm pivot pin 80 extending through an aperture 81 in the body of the rocker arm and positioned above aperture 73. Pin 80 includes a pair of vertically extending tongues 82 on opposite ends thereof which extend into vertical slots 84 formed in a pair of rocker pivot pin guides 86 and 88 secured within housing sections 12 and 14, respectively, by means of screws 85 (FIG. 2). The guides 86 and 88 permit the rocker arm 70 to pivot with respect to the engine housing and reciprocate the connecting rod 60 during engine operation while permitting the rocker arm to move vertically the required amount as end 62 of the connecting rod moves up and down. Thus, the interconnection of the rocker arm 70 to the engine housing provides a floating pivot point permitting the required pivotal motion and lineal motion of the rocker arm.

The upper end 71 of the rocker arm includes an aperture 75 therethrough for receiving a crosshead pivot pin 77 providing a pivot connection between the upper end 71 of the rocker arm and the main engine piston assembly 90.

Assembly 90 comprises a pair of pistons 92 and 94 mounted on piston rods 95 and 97 extending from opposite ends of an integral crosshead block 96. Piston rods 95 and 97 are hollow and include threaded ends permitting pistons 92 and 94 to be removably attached to the piston rod by means of piston screws 93 which extend through apertures in the heads of the pistons. The pistons include conventional compression rings 98 but due to the unique oiling system described below, do not require the usual oil control rings. Motion of the opposed pistons 92 and 94 is in a reciprocal fashion within the cylinders along a line of travel indicated by arrow A in FIG. 1 and causes the rocker arm 70 to reciprocate about pivot pin 80, in turn causing the connecting rod 60 to move back and forth and slightly vertically driving the eccentric drive of drive shaft 30 causing it to rotate continuously in one direction as the pistons reciprocate.

In order to provide counterbalancing in part for the moving mass of the main engine piston assembly, a pair of counterbalancing arms 100 and 110 are provided and are now described. Each of the counterbalance arms is pivotally mounted to the engine housing by means of a pivot pin 102 extending through integrally formed sleeves 104 and 114 of the lower end of the counterbalance arms and seated in the castings 12 and 14 below connecting rod 60. Each of the counterbalance arms includes an elongated longitudinally extending slot 106 and 116, respectively, for slidably receiving the tongues 78 of the counterbalance drive pins 76. As the rocker arm 70 rotates about pivot pin 80, drive pin 76 causes the counterbalance arms 100 and 110 to move in a direction opposite pistons 92 and 94, thereby providing the desired counterbalancing effect. The counterbalance arms are positioned on opposite sides of and immediately adjacent the guides 86 and 88 for the rocker arm pivot connection and include enlarged heads 108 and 118 which can be drilled and lead weighted as required to increase the counterbalancing weight thereof. By providing the pair of spaced counterbalance arms, each with weighted heads, dynamic balancing of the engine is facilitated.

In order to intercouple the igniter engine pistons in synchronism with the main engine pistons utilizing a minimum of movable parts, an interconnecting yoke 120 is employed and is pivotally coupled to the engine housings and driven through the counterbalancing arms 100 and 110. This structure is now described in detail.

Each of the counterbalance arms 100 and 110 includes an outwardly and upwardly extending leg 101 and 111 respectively. Formed from the top edge of each of the vertically extending portions of legs 101 and 111 there is provided a notch 103 and 113, respectively, for receiving the tongues 105 and 115 of a pair of pivoted yoke driving pins 107 and 117 respectively. These pins are pivotally coupled within an aperture in the lower end of each of a pair of downwardly depending legs 122 and 124 of yoke 120. Legs 122 and 124 are joined at the opposite end by a cross member 123 which spaces the legs in parallel relationship to one another outboard of counterbalance arms 100 and 110. Intermediate cross arm 123 and pivot pins 107 and 117 there is an enlarged aperture 125 in arm 122 and a similar aperture in arm 124 for receiving the end of fixed pivot pins 126 and 128 (FIG. 3). Pins 126 and 128 extend through housing members 14 and 12, respectively, into apertures 125 of the yoke providing a fixed pivot point for the yoke with respect to the engine housing.

Extending upwardly from the central portion of cross member 123 of yoke 120 is a leg 129 having an aperture therein containing a crosshead pivot pin 130 with vertically extending tongues 132 extending from opposite sides thereof. Leg 129 and tongues 132 of pin 130 extend through a rectangular aperture 142 formed in a second crosshead block 140 associated with the igniter engine pistons. Block 140 includes a pair of vertically extending recesses 142' on opposite sides thereof and into which tongues 132 slidably fit. The crosshead block 140 includes piston rods 145 and 147 extending from opposite sides and to which are coupled the relatively small igniter engine pistons 150 and 152 respectively. Piston head screws 153 extend through apertures in the heads of the igniter piston and are threaded into the ends of rods 145 and 147 for removably securing the pistons to the rods. As with the main engine pistons, the igniter engine pistons include only compression rings 154.

It is seen that inasmuch as the fixed pivot connection of yoke 120 to the housing is above the drive connection between the yoke and the counterbalance arms, the igniter pistons will be driven in a direction opposite the counterbalance arms and in the same direction as the main engine pistons. Thus, the pistons move in synchronism and in opposition to the counterbalance arms which provide counterbalancing both for the main engine pistons and the igniter engine pistons. Having described the primary internal moving structure of the engine together with the major pivot connections of these elements to the engine housing and their interconnection, the remaining supporting structure for the engine and the piston assemblies is now described with reference to FIGS. 2 and 3.

In order to slidably support the crosshead blocks associated with the igniter and main engine piston assemblies, secured to the housing halves 12 and 14 are crosshead guides which support the crosshead blocks while the cylinders support the pistons for lineal reciprocal motion. The main engine includes, as best seen in FIGS. 2 and 3, an upper crosshead guide block 160 secured to the housings at opposite ends to permit clearance of the counterbalances and yoke during engine operation. This crosshead guide engages and supports the upper surface of crosshead block 96 associated with the main engine. Below the crosshead block 96 is a split pair of lower crosshead guides 162 and 164 for slidably supporting the lower surface of block 96. Similarly, the igniter engine includes crosshead guides which, as best seen in FIG. 3, comprise U-shaped members 166 and 168 facing one another to partially surround and slidably support the upper crosshead block 140 associated with the igniter engine piston assembly.

Castings 12 and 14 extend upwardly around the crossheads and the piston rods of each of the engine portions to permit sealing of the crankcase section from the piston cylinders. As best seen in FIG. 2, an aperture 170 is formed through the housing permitting piston rod 95 to extend therethrough. A seal 172 threadably fitted in aperture 170 seals the piston rod-housing interface permitting the rod to slide through the seal during operation. On the opposite side, a threaded aperture 171 is provided into which a second seal 173 is threadably secured for slidably sealing the interface between piston rod 97 and the housing. Apertures 174 are also provided in the housing to accommodate a pair of seals 175 for the igniter piston rod-housing interfaces.

It is seen that with such an arrangement, the crankcase area is effectively sealed from contamination from the combustion cylinders and the smaller volume of the cylinders in the combustion area of the two cycle engine more effectively draws in the fuel/air mixture, transfers the charge, and expels the exhaust since the volume of gases required to be moved is significantly reduced. Also, due to the effective sealing of the inside ends of the combustion chambers, higher compression can be obtained. In the case of the ingiter engine, in order to permit control of the compression ratio, filler blocks 176 are employed and are secured to the housing by bolts, as best seen in FIG. 2, to selectively fill the cylinder space without interfering with the piston movement or that of the associated piston rods. It is seen that the main engine likewise could include filler blocks of selectable size to vary the compression ratio as required.

Figure 2A:
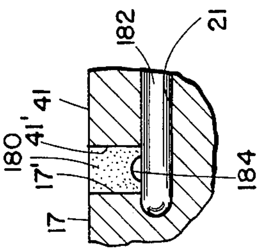
FIG. 2A is an enlarged fragmentary view of the encircled portion of FIG. 2 referenced as FIG. 2A.

The engine design includes an improved and unique oiling system in which oil is directly applied to the cylinder walls of the pistons by means of an annular ring of porous wear- and heat-resistant material such as sintered bronze recessed into the cylinder walls and supplied with pressurized oil directly lubricate the pistons during engine operation. This construction is best seen in FIGS. 2 and 2A where it is seen that each of the cylinder housings 16 and 18 defines cylindrical piston-receiving cylinders for the main and igniter engines. Cylinder housing 16, for example, is cast and machined with interior cylindrical surfaces 17 and 19, respectively, for receiving pistons 92 and 150 of the main and igniter engines respectively. The cylinder is step-cut at 21 and 23 forming a cylinder of slightly larger diameter permitting the insert of cylinder sleeves 41 for the main engine cylinder and 43 for the igniter engine cylinder. Sleeves 41 and 43 are inserted into the cylinder housing before assembly to the main housings 12 and 14 to sandwich an annular ring 180 of sintered bronze material between the end 41' of the sleeve 41 and the step-cut end 17' of the main cylinder wall (FIG. 2A). At least a pair of longitudinally extending semicircular recesses 182 is formed at intervals spaced approximately 180° in the enlarged cylindrical surface of the cylinder housings as also seen in FIG. 4. When sleeves 41 and 43 are inserted against the rings 180, recesses 182 define oil passages which communicate with the rear surface of the rings to provide an oil supply for lubrication of pistons.

In order to assure that the oiling insert 180 is uniformly supplied with oil, its rear surface includes an annular semicircular recess 184 extending 360° around the ring so that oil from passageways 182 will fill the passageway defined by the recess 184 behind the entire periphery of the oiling ring 180. Each of the cylinders includes similar structure as best seen in FIG. 2. Such an arrangement permits the direct oiling of the cylinder walls in a controlled fashion. Although sintered bronze is the preferred material and readily available in sleeves which can be cut into the rings, other porous metallic or ceramic material likewise can be employed. The utilization of sleeve inserts 41, 43 is employed in the manufacture of the engine to facilitate the mounting of the oiling inserts within the cylinder walls and the formation of the oil passageways 182. It is possible, however, to assemble oiling rings into the cylinder wall in other manners than specifically described herein.

The upper portions of the engine including the crosshead guides are lubricated by conventional oil passageways, such as opening 186 shown in FIG. 2, which are formed through the housings to inject oil at critical areas where required. The lower moving portions of the engine are lubricated by oil in the crankcase which splashes around the various elements during engine operation. A conventional oil pump is coupled to the auxiliary drive gear 15 (FIG. 4) to provide the pressurized oil for the direct cylinder lubrication system as well as the upper engine lubrication. The pressure of the oil supplied can be varied if desired to provide the most efficient oiling of the upper engine without excessive oiling.

The two cycle engine of the preferred embodiment incorporates ports for the intake, transfer and exhaust of fuel and combustion gases as is conventional in two cycle engines. Although the porting system can be conventional (with the exception of the injection of flame-ignited combustion products from the igniter engine into the main engine cylinders), an improved system has been devised for the preheating and the complete vaporization of fuel and protecting the housing from hot exhaust gases. The porting system for the engine will now be briefly described in conjunction with FIGS. 1, 2, 4, 8 and 9 as well as the unique integral intake-exhaust manifold therefor as shown in FIGS. 5 and 6.

Figure 5:
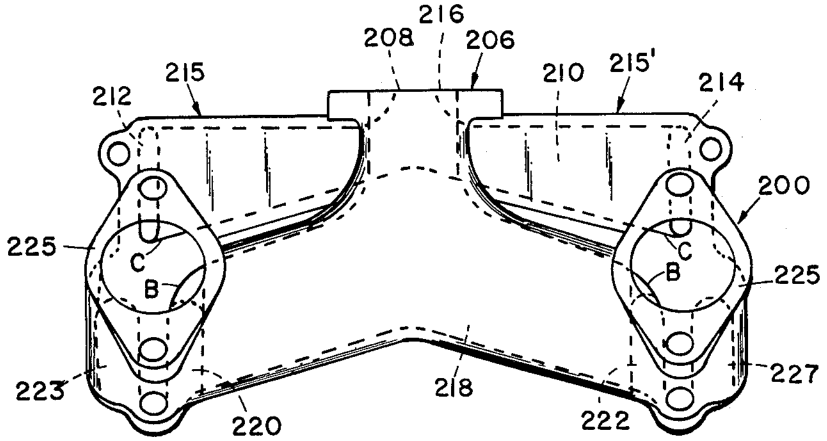
FIG. 5 is a front view partly in phantom form of the integral intake and exhaust manifold for the engine also shown in FIG. 4.
Figure 6:
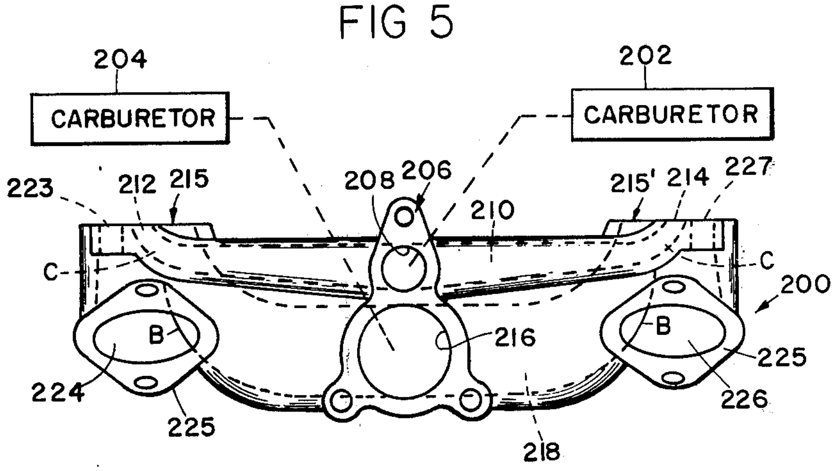
FIG. 6 is a top plan view of the manifold shown in FIG. 5 showing the carburetors therefor in schematic form.

The integral manifold 200 is shown separately in FIGS. 5 and 6 and shown coupled to the engine in FIG. 4. The manifold serves both as the intake and exhaust manifold and includes a mounting flange 206 for first and second carburetors 202 and 204 associated with the igniter and main engines respectively. Flange 206 includes an aperture 208 communicating with a manifold passageway 210 which transports the fuel/air mixture from the small carburetor 202 associated with the igniter engine to the two igniter engine cylinders. The passageway 210 terminates at opposite ends in openings 212 and 214 in mounting plate surfaces 215 and 215' respectively. As seen in FIG. 4, the manifold is bolted to the engine housing with surfaces 215, 215' facing the housing for coupling the open ends of these passageways to the intake ports of the igniter engine.

Flange 206 also includes an aperture 216 communicating with a passageway 218 for the fuel/air mixture from the large carburetor. Passageway 218 also terminates in the mounting plates at opposite ends in a pair of openings 220 and 222 which communicate with the intake ports formed through the side walls of the housing for the main engine cylinders.

Manifold 200 further includes a pair of exhaust ducts 224 and 226 terminated on the engine side of the manifold by apertures 223 and 227 which align and communicate with the exhaust ports 240, 245 (FIG. 8) of the main engine cylinders and on the opposite side in flanges 225 providing coupling means for exhaust pipes to the manifold for exhausting gases from the engine.

The manifold construction, as best seen in FIGS. 5 and 6, juxtaposes the exhaust ducts 224 and 226 of the manifold with the curved intake manifold passageways 210 and 218 such that the incoming fuel is preheated at areas B and C of the passageways 218 and 210 respectively. This preheats the fuel and prevents droplet formation on the curved manifold walls as can occur when the fuel/air mixture is cooled due to the Venturi action of the carburetors.

The fuel entering through the manifold 200 enters the engine 10 through intake ports of the cylinder housings which are located in the cylinder at the lower end of travel of the piston. Fuel is then transferred to the combustion chambers by means of transfer ports 47 and 49 and associated ducts for the main engine cylinder and ports 57 and associated ducts for the igniter engine (FIGS. 2 and 4). These ports, as is conventional in two cycle engines, transfer the fuel charge from the underside of the piston to the combustion chamber of the piston during the intake and compression portion of each cycle of operation.

Figure 7:
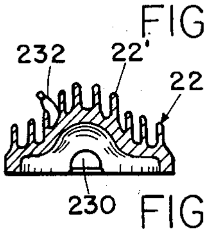
FIG. 7 is a cross-sectional view of one of the engine's cylinder heads taken along section line VII—VII of FIG. 2.

With the improved engine design of this invention, the flame ignition of the main cylinder by the combustion of the relatively rich fuel/air mixture in the small engine is facilitated by the flame ignition port 230 (FIGS. 2 and 7) formed in each of the cylinder heads 22 and 23. The somewhat restricted port 230 provides direct and continuous communication between the associated combustion chambers of the main and igniter engines. A spark plug 232 in the head of the igniter engine ignites the fuel/air mixture which combusts and in a jet action, flames into the relatively lean fuel/air mixture present in the main engine combustion area to ignite the lean mixture. This direct communication path between the igniter and main engines permits the efficient combustion of the lean mixture without requiring other ignition means.

Figure 9:
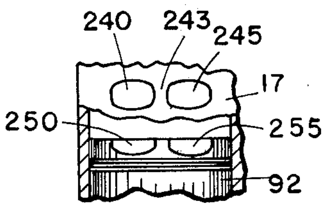
FIG. 9 is a fragmentary side elevational view partly broken away and in cross section of the structure of FIG. 8 as viewed from direction IX in FIG. 8.
Figure 8:
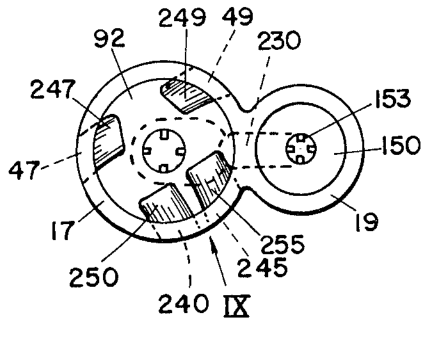
FIG. 8 is an end view of one of the cylinders and pistons with the head removed showing the associated porting structure and piston head configuration.

The only exhaust means required for the engine is that associated with the main engine cylinders which includes a pair of exhaust ports 240 and 245, as best seen in FIG. 9, which are formed through the cylinder walls 17 of the main engine cylinders. In order to maintain the maximum cylinder strength and yet provide a relatively large exhaust opening, the pair of ports is provided with an exhaust port bridge 243 therebetween for structural purposes. In order to protect the bridge 243 from erosion due to the concentrated heat of the exhaust gases, the upper portion of the piston head is configurated, as seen in FIGS. 8 and 9, to include scooped out, concavely formed areas 250 and 255 corresponding to and positioned in alignment with the exhaust ports to direct the exhaust gases away from the exhaust port bridge 243 and directly out from the ports 240 and 245. The top surface of the piston also includes scooped out areas 247 and 249 for directing gases from the transfer ports 47 and 49 more efficiently into the combustion chamber. It is noted here that heads 22 and 24 each include a plurality of parallel cooling fins 22' and 24', respectively, for more efficiently air cooling the engine.

Having described the detailed construction of the engine and its various features, a brief description of a cycle of operation of the engine is presented with reference to FIGS. 10–13.

OPERATION

Figure 10:
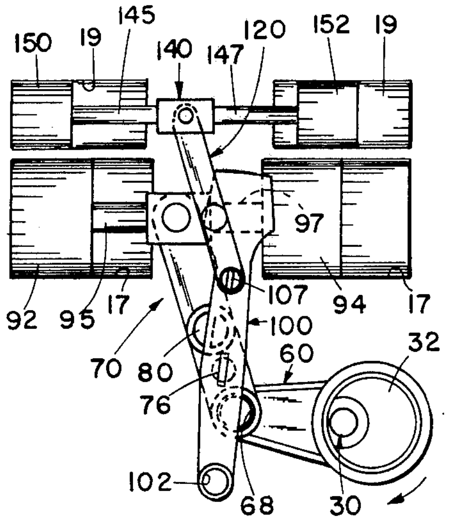
FIG. 10 is a schematic sequence drawing showing the positioning of the primary movable elements of the preferred embodiment of the invention in a first position during a cycle of operation.

Referring first to FIG. 10, pistons 92 and 150 are top dead center and the combustion chamber associated with piston 150 is fired by a spark plug 232 (FIG. 7) causing combustion and flame ignition of the main engine combustion chamber associated with piston 92. At the same time, a fuel and air mixture has been drawn into the opposite side of pistons 92 and 150 through manifold 200 and intake ports associated with these cylinders. In FIG. 4, only intake port 61 of the igniter engine cylinder is seen, which port communicates with the intake duct 210 associated with the manifold. During the firing of the pistons shown on the left side in FIG. 10, the opposed pistons 94 and 152 have exhausted gases through the exhaust manifold and at the same time, transferred the previously received charge of fuel and air from the lower side of the pistons up into the combustion chamber area through the transfer ducts.

Figure 11:
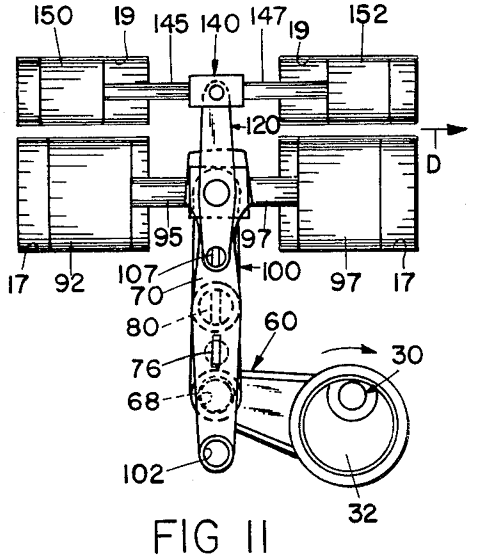
FIG. 11 is a schematic sequence drawing showing the positioning of the primary movable elements of the preferred embodiment of the invention in a second position during a cycle of operation.

In FIG. 11, both piston assemblies are moving to the right, as indicated by arrow D, with the left side pistons providing the power stroke while also transferring the fuel and air into the combustion chambers and forcing out the exhaust gases. At the same time, right side pistons 94, 152 are compressing their fuel/air mixture and drawing in another charge of fuel and air. At this time, connecting rod 60 has been moved to the left somewhat, rotating the drive shaft 30 clockwise through 90° by means of the eccentric drive 32.

Figure 12:
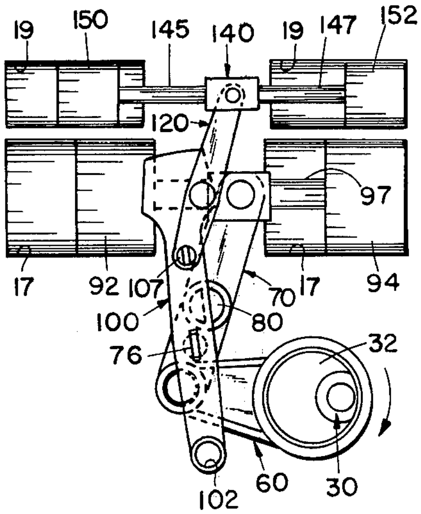
FIG. 12 is a schematic sequence drawing showing the positioning of the primary movable elements of the preferred embodiment of the invention in a third position during a cycle of operation.

In FIG. 12, the right side pistons are top dead center and are firing. At the same time, the pistons shown at the left-hand side continue exhausting the combustion by-products and transferring the previously drawn in fuel/air mixture into the combustion chambers. As the pistons move from the position shown in FIG. 11 to that of FIG. 12, the connecting rod 60 moves to the left even further, rotating the drive shaft through another 90°.

Figure 13:
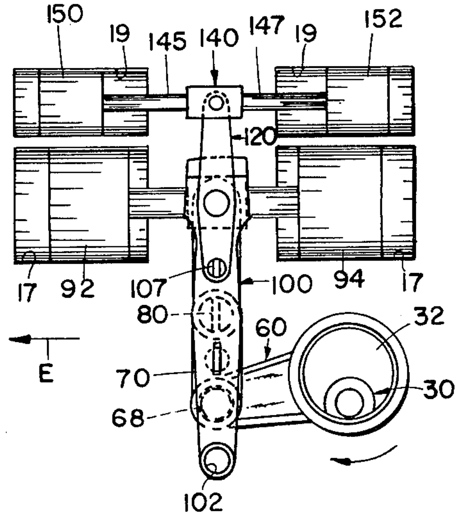
FIG. 13 is a schematic sequence drawing showing the positioning of the primary movable elements of the preferred embodiment of the invention in a fourth position during a cycle of operation.

In FIG. 13, the pistons on the right-hand side of the diagram are moving to the left as shown by arrow E during their power stroke while also transferring a charge of fuel and air from their underside and exhausting the combustion by-products. The pistons on the left-hand side are compressing the charge of fuel and air mixture previously drawn into the combustion chamber area. At this time, the connecting rod 60 reverses direction and is moving to the right in the figure causing an additional 90° rotation of the drive shaft 30. As the power stroke for the pistons 94 and 152 is completed, the cycle is repeated again, placing the movable engine elements in the position shown in FIG. 10. With this drive system, it is seen, therefore, that for each revolution of the drive shaft, two power impulses are applied to the shaft.

Due to the unique mechanical construction of the system, the rocker arm 70 and counterbalances 100 and 110 oscillate only through an angle of approximately 28° twice corresponding to 56° of bearing movement per drive shaft revolution. Thus, this causes only a fraction of the wear on bearing surfaces that is customary with conventional engine designs. With the opposed piston design of the present invention, additionally, wear on the various moving parts is reduced inasmuch as the nonfiring piston is undergoing compression which provides a cushioning effect to the parts coupled to the piston rods. The counterbalance arms provide the required counterbalancing to overcome any engine vibration which might otherwise occur.

Figure 1:
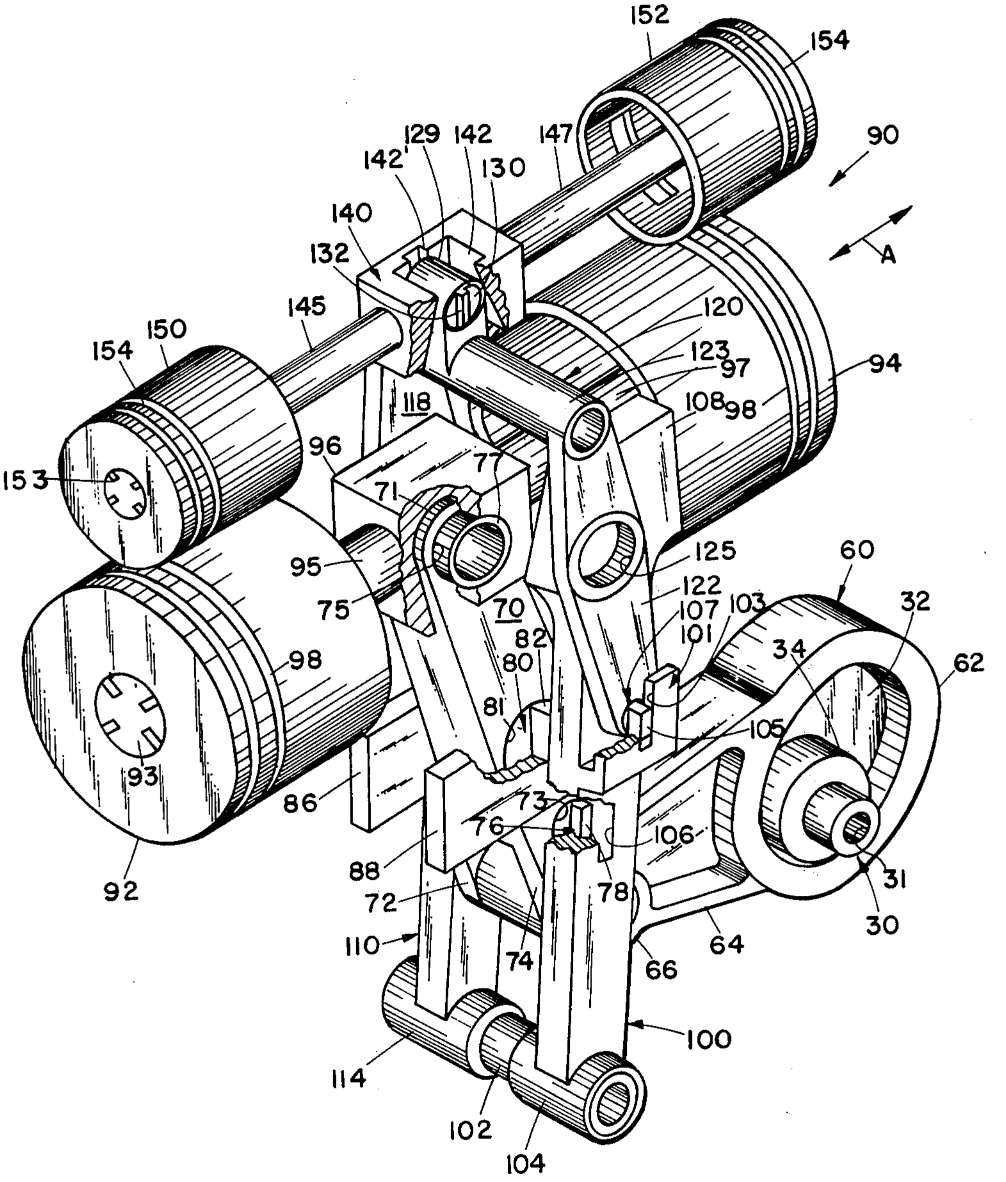
FIG. 1 is a perspective view partly broken away of the internal moving elements of a preferred embodiment of the engine of the present invention.
Figure 14:
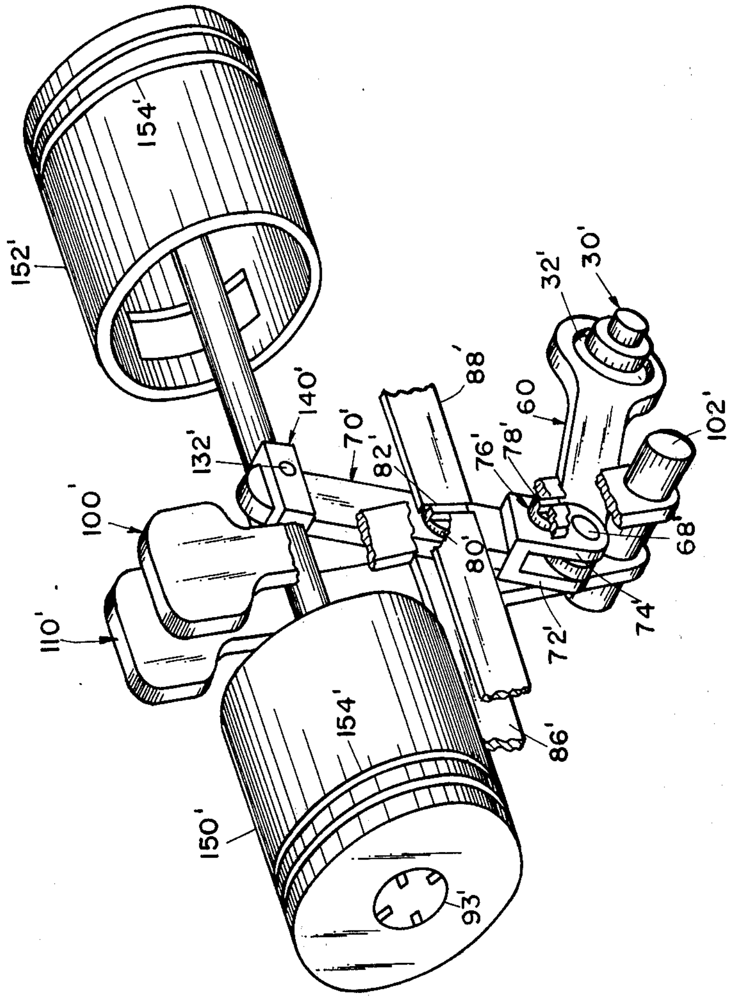
FIG. 14 is a perspective view of the primary internal moving elements of another embodiment of the present invention.

In addition to the engine shown in the preferred embodiment of FIGS. 1–13, the unique mechanical interconnection of the primary moving parts of the engine can be utilized in a simplified engine design as shown in FIG. 14. In FIG. 14, those parts identical to those shown in FIG. 1 are identified by the same reference numerals followed by a prime (') symbol. Inasmuch as the parts are identical, there is no need to describe them in any detail other than to note that the engine of the FIG. 14 design utilizes only a pair of relatively large opposed pistons which are employed in a cylinder which includes its own ignition system such as spark plugs for igniting a conventional relatively rich fuel/air mixture. Thus, although the engine design as shown in FIG. 14 does not incorporate the energy saving and air pollution reduction concepts of the preferred embodiment of the invention, it does utilize the novel eccentric drive and associated coupling means for providing a minimum of wear on the moving parts and provides a compact engine design which will permit the transmission and clutch mounting arrangement as shown in FIG. 4.

In the preferred embodiment of the engine design, the main engine bore is 3¼ inches with a 2 inch stroke. The igniter cylinders have a bore of 2 inches and a stroke of 1½ inches. Also in the preferred embodiment, the overall length of the main piston rod is 8¾ inches as is the piston rod assembly for the igniter engine. The counterbalance arms have an overall length of 9¾ inches while the rocker arm length is approximately 8 inches. Similarly, the length of yoke 120 is 6½ inches. The eccentric drive provides an offset of ¾ inch in conjunction with the connecting rod which has an overall length of approximately 6 inches.

The compression ratio of the igniter engine is always somewhat higher than the compression ratio of the main engine to assure flame ignition of the main engine. The mean compression ratio of both engines can be from 4:1 to 8:1. The relatively rich fuel/air mixture of the igniter engine can be from 1:12 to 1:15 while the relatively lean mixture of the main engine is about 1:18 to 1:25.

It will be understood by those skilled in the art that various of the features of the preferred embodiment of the present invention can be employed independently of the overall engine forming the preferred embodiment. Thus, for example, the unique direct oiling system, the mechanical drive means, or the integral intake and exhaust manifolding system could be employed in other engine designs, either singly or in combination. It will become apparent to those skilled in the art also that integrally added to the basic four cylinder design of the preferred embodiment can be a second identical engine design having its cycle of operation displaced 90° from that of the preferred embodiment of the invention to provide four power impulses to a drive shaft for each of its revolutions. These and other modifications to the present invention will, however, fall within the spirit and scope of the invention as defined by the appended claims.

The embodiments of the invention in which an exclusive property or privilege is claimed are defined as follows:

1. An improved drive means for coupling an engine including a piston driven connecting rod to a transmission comprising:

an elongated hollow drive shaft and eccentric drive means coupling said drive shaft to the connecting rod of the engine for rotation of said drive shaft by said engine;

a transmission shaft extending through said hollow drive shaft and coextensive with said drive shaft and means for supporting said transmission shaft in spaced relationship within said drive shaft;

means for coupling a clutch to said drive shaft and to said transmission shaft at one end thereof; and housing means for coupling a transmission to said transmission shaft at an end remote from said one end whereby the clutch and transmission are located at opposite sides of said engine.

2. The drive means as defined in claim 1 wherein said drive shaft is rotatably mounted in the engine and includes bearing support means at opposite ends of the engine for rotatably supporting said transmission shaft in generally coaxial spaced relationship to said drive shaft.

3. The drive means as defined in claim 2 wherein said drive shaft includes an eccentric cam for rotation of said drive shaft by the engine and a pair of integral single piece bearings positioned on opposite sides of said eccentric cam for rotatably supporting said drive shaft in the engine.

4. The drive means as defined in claim 3 wherein said drive shaft includes a flywheel coupled to said drive shaft at said one end and said transmission shaft is splined at said one end for facilitating coupling of said transmission shaft to a clutch.

5. An internal combustion engine and drive means comprising:

an engine housing;

an elongated hollow drive shaft rotatably mounted to said housing and including eccentric drive means;

a connecting rod having one end coupled to said eccentric drive means;

a rocker arm having one end pivotally coupled to an end of said connecting rod remote from said eccentric drive means and coupling means extending between said engine housing and said rocker arm spaced from the connection of said rocker arm to said connecting rod for pivotally and slidably coupling said rocker arm to said housing;

piston means including a piston rod pivotally coupled to an end of said rocker arm remote from said one end such that movement of said piston means is translated through said rocker arm, said connecting rod and said eccentric drive to rotate said drive shaft during engine operation;

a transmission shaft extending through said hollow drive shaft and coextensive with said drive shaft and means for supporting said transmission shaft in spaced relationship within said drive shaft;

means for coupling a clutch to said drive shaft and to said transmission shaft at one end thereof; and housing means for coupling a transmission to said transmission shaft at an end remote from said one end whereby the clutch and transmission are located at opposite sides of said engine.

* * * * *